United States Patent

Isobe et al.

[11] Patent Number: 6,125,161
[45] Date of Patent: Sep. 26, 2000

[54] METHOD FOR MAKING ZR ALLOY NUCLEAR REACTOR FUEL CLADDING HAVING EXCELLENT CORROSION RESISTANCE AND CREEP PROPERTIES

[75] Inventors: Takeshi Isobe, Ohmiya; Yoshitaka Suda, Okegawa, both of Japan

[73] Assignee: Mitsubishi Materials Corporation, Tokyo, Japan

[21] Appl. No.: 09/397,094

[22] Filed: Sep. 16, 1999

Related U.S. Application Data

[62] Division of application No. 09/169,968, Oct. 13, 1998.

[30] Foreign Application Priority Data

Oct. 13, 1997 [JP] Japan ................................. 9-278935
Oct. 9, 1998 [JP] Japan ................................. 10-287800

[51] Int. Cl.$^7$ .................... G21C 3/07; C22C 16/00; C22F 1/18
[52] U.S. Cl. .................... 376/410; 376/260; 376/261; 376/414; 376/416; 420/422; 148/672
[58] Field of Search ................ 376/260, 261, 376/410, 414, 416; 420/422; 148/672

[56] References Cited

U.S. PATENT DOCUMENTS

| | | | |
|---|---|---|---|
| 4,649,023 | 3/1987 | Sabol et al. ......................... | 420/422 |
| 4,963,303 | 10/1990 | Anderson . | |
| 4,963,323 | 10/1990 | Matsuo et al. ..................... | 420/422 |
| 5,017,336 | 5/1991 | Matsuo et al. . | |
| 5,125,985 | 6/1992 | Foster et al. ....................... | 148/672 |
| 5,196,163 | 3/1993 | Matsuo et al. ..................... | 420/422 |
| 5,245,515 | 9/1993 | Worcester et al. .................. | 148/672 |
| 5,437,747 | 8/1995 | Adamson et al. .................. | 148/519 |
| 5,560,790 | 10/1996 | Nikulina et al. .................... | 148/672 |
| 5,618,356 | 4/1997 | Adamson et al. .................. | 148/519 |
| 5,901,193 | 5/1999 | Dahlback et al. .................. | 376/416 |
| 5,912,935 | 6/1999 | Isobe et al. ......................... | 376/261 |

FOREIGN PATENT DOCUMENTS

| | | | |
|---|---|---|---|
| 446924 | 9/1991 | European Pat. Off. ............ | 148/672 |
| 6-279963 | 10/1994 | Japan ................................. | 148/672 |

*Primary Examiner*—Charles T. Jordan
*Assistant Examiner*—Jack Keith
*Attorney, Agent, or Firm*—Oblon, Spivak, McClelland, Maier & Neustadt, P.C.

[57] ABSTRACT

The invention provides a method for making Zr alloy nuclear reactor fuel cladding having excellent corrosion resistance and creep properties. The method includes performing hot forging, solution heat treatment, hot extruding, and repeated cycles of annealing and cold rolling of a Zr alloy including, by weight, 0.2 to 1.7% Sn, 0.18 to 0.6% Fe, 0.07 to 0.4% Cr and 0.05 to 1.0% Nb, with the remainder being Zr and incidental impurities, and the incidental nitrogen impurity content being 60 ppm or less, and then performing final stress relief annealing thereon. The annealing is performed at a temperature of 550° C. to 850° C. for 1 to 4 hours such that the accumulated annealing parameter $\Sigma Ai = \Sigma ti \cdot \exp(-40,000/Ti)$ satisfies relationships $-20 \leq \log \Sigma Ai \leq -15$, and $-18 - 10 \cdot X_{Nb} \leq \log \Sigma Ai \leq -15 - 3.75 \cdot (X_{Nb} - 0.2)$, wherein Ai represents the annealing parameter for the i-th annealing, ti represents the annealing time (hours) for the i-th annealing, Ti represents the annealing temperature (K) for the i-th annealing, and $X_{Nb}$ represents the Nb concentration (wt %).

4 Claims, 2 Drawing Sheets

METHOD FOR MAKING ZR ALLOY NUCLEAR REACTOR FUEL CLADDING HAVING EXCELLENT CORROSION RESISTANCE AND CREEP PROPERTIES

This application is a Division of application Ser. No. 09/169,968 filed on Oct. 13, 1998.

BACKGROUND OF THE INVENTION

1. Field of the Invention

The present invention relates to a method for making Zr alloy cladding for nuclear reactor fuel. The Zr alloy cladding has excellent corrosion resistance when it is exposed to hot high-pressure water or steam, and has excellent creep properties.

2. Description of the Related Art

A general type of nuclear reactor is a pressurized water reactor (PWR). A cladding tube for reactor fuel used in this type of reactor is made of a Zr alloy. A typical Zr alloy used in such a cladding tube is Zircaloy-4, which is composed of (hereinafter percentages are percent by weight) 1.2 to 1.7% Sn, 0.18 to 0.24% Fe, and 0.07 to 0.13% Cr, with the balance being Zr and incidental impurities.

Nb- or Nb/Ta-containing Zr alloys having excellent corrosion resistance have also been proposed for cladding tubes. The Nb-containing Zr alloy is composed of 0.2 to 1.7% Sn, 0.18 to 0.6% Fe, 0.07 to 0.4% Cr, and 0.05 to 1.0% Nb, with the balance being Zr and incidental impurities, wherein the nitrogen content as an incidental impurity is 60 ppm or less. The Nb/Ta-containing Zr alloy is composed of 0.2 to 1.7% Sn, 0.18 to 0.6% Fe, 0.07 to 0.4% Cr, 0.05 to 1.0% Nb and 0.01 to 0.1% Ta, with the balance being Zr and incidental impurities, wherein the nitrogen content as an incidental impurity is 60 ppm or less.

The profitability of a nuclear power plant can be increased by reacting fuel for longer periods of time. This requires increasing the residence time of fuel cladding tubes in reactors. However, the above-mentioned cladding tubes made of Nb-containing or Nb/Ta-containing Zr alloys do not have sufficient durability to meet long reactor residence time requirements because these alloys do not have sufficiently high corrosion resistance and sufficiently low creep properties. Thus, there is a need for high durability nuclear fuel cladding.

SUMMARY OF THE INVENTION

The present inventors have researched a method for making Zr alloy nuclear reactor fuel cladding tube having corrosion resistance and creep properties that are superior to those of conventional cladding tubes. The present inventors have discovered that the corrosion resistance and creep properties of Zr alloy cladding tube made from a conventional Nb- or Nb/Ta-containing Zr alloy can be improved by controlling heat treatment conditions, in particular annealing conditions, when making the cladding tube. The resulting Zr alloy cladding can have a long service life.

A first aspect of the present invention is a method for making Zr alloy nuclear reactor fuel cladding having excellent corrosion resistance and creep properties, comprising: performing hot forging, solution heat treatment, hot extruding, and repeated cycles of annealing and cold rolling of a Zr alloy including, by weight, 0.2 to 1.7% Sn, 0.18 to 0.6% Fe, 0.07 to 0.4% Cr and 0.05 to 1.0% Nb, with the remainder being Zr and incidental impurities, and the incidental nitrogen impurity content being 60 ppm or less, and then performing final stress relief annealing thereon; wherein the annealing is performed in a range of temperatures between about 550° C. and about 850° C. for a period of time between about 1 and about 4 hours such that the accumulated annealing parameter $\Sigma Ai$ represented by $\Sigma Ai = \Sigma ti \cdot \exp(-40,000/Ti)$ satisfies the relationships:

$-20 \leq \log \Sigma Ai \leq -15$, and $-18 - 10 \cdot X_{Nb} \leq \log \Sigma Ai \leq -15 - 3.75 \cdot (X_{Nb} - 0.2)$, wherein Ai represents the annealing parameter for the i-th annealing, ti represents the annealing time (hours) for the i-th annealing, Ti represents the annealing temperature (K) at the i-th annealing, and $X_{Nb}$ represents the Nb concentration (wt %).

A second aspect of the present invention is a method for making Zr alloy nuclear reactor fuel cladding having excellent corrosion resistance and creep properties, comprising: performing hot forging, solution heat treatment, hot extruding, and repeated cycles of annealing and cold rolling of a Zr alloy including, by weight, 0.2 to 1.7% Sn, 0.18 to 0.6% Fe, 0.07 to 0.4% Cr and 0.05 to 1.0% Nb, with the remainder being Zr and incidental impurities, and the incidental nitrogen impurity content being 60 ppm or less, and then performing final stress relief annealing thereon; wherein the annealing is performed in a range of temperatures between about 550° C. and about 850° C. for a period of time between about 1 and about 4 hours such that the accumulated annealing parameter $\Sigma Ai$ represented by $\Sigma Ai = \Sigma ti \cdot \exp(-40,000/Ti)$ satisfies the relationships:

$-20 \leq \log \Sigma Ai \leq -15$, and $-18 - 10 \cdot X_{Nb} \leq \log \Sigma Ai \leq -15 - 3.75 \cdot (X_{Nb} - 0.2)$, wherein Ai represents the annealing parameter for the i-th annealing, ti represents the annealing time (hours) for the i-th annealing, Ti represents the annealing temperature (K) at the i-th annealing, and $X_{Nb}$ represents the Nb concentration (wt %); and the accumulated annealing parameter $\Sigma Ai$ further satisfies the relationships:

wherein $0.05 \leq X_{Nb} \leq 0.5$, $-20 \leq \log \Sigma Ai \leq -15$, and $-18 - 10 \cdot X_{Nb} \leq \log \Sigma Ai \leq -15 - 3.75 \cdot (X_{Nb} - 0.2)$; and when $0.5 < X_{Nb}$, $-20 \leq \log \Sigma Ai \leq -18 - 2 \cdot (X_{Nb} - 0.5)$.

A third aspect of the present invention is a method for making a Zr alloy nuclear reactor fuel cladding having excellent corrosion resistance and creep properties, comprising: performing hot forging, solution heat treatment, hot extruding, and repeated cycles of annealing and cold rolling of a Zr alloy including, by weight, 0.2 to 1.7% Sn, 0.18 to 0.6% Fe, 0.07 to 0.4% Cr, 0.05 to 1.0% Nb and 0.01 to 0.1% Ta, with the remainder being Zr and incidental impurities, and the incidental nitrogen impurity content being 60 ppm or less, and then performing final stress relief annealing thereon; wherein the annealing is performed in a range of temperatures between about 550° C. and about 850° C. for a period of time between about 1 and about 4 hours such that the accumulated annealing parameter $\Sigma Ai$ represented by $\Sigma Ai = \Sigma ti \cdot \exp(-40,000/Ti)$ satisfies the relationships:

$-20 \leq \log \Sigma Ai \leq -15$, and $-18-10 \cdot X_{Nb+Ta} \leq \log\Sigma Ai \leq -15-3.75 \cdot (X_{Nb+Ta}-0.2)$, wherein Ai represents the annealing parameter for the i-th annealing, ti represents the annealing time (hours) for the i-th annealing, Ti represents the annealing temperature (K) at the i-th annealing, and $X_{Nb+Ta}$ represents the total concentration of Nb and Ta (wt %).

A fourth aspect of the present invention is a method for making Zr alloy nuclear reactor fuel cladding having excellent corrosion resistance and creep properties, comprising: performing hot forging, solution heat treatment, hot extruding, and repeated cycles of annealing and cold rolling of a Zr alloy including, by weight, 0.2 to 1.7% Sn, 0.18 to 0.6% Fe, 0.07 to 0.4% Cr, 0.05 to 1.0% Nb and 0.0 1 to 0.1% Ta, with the remainder being Zr and incidental impurities, and the incidental nitrogen impurity content being 60 ppm or less, and then performing final stress relief annealing thereon; wherein the annealing is performed in a range of temperatures between about 550° C. and about 850° C. for a period of time between about 1 and about 4 hours such that the accumulated annealing parameter $\Sigma Ai$ represented by $\Sigma Ai = \Sigma ti \cdot \exp(-40,000/Ti)$ satisfies the relationships:

$-20 \leq \log\Sigma Ai \leq -15$, and $-18-10 \cdot X_{Nb+Ta} \leq \log\Sigma Ai \leq -15-3.75 \cdot (X_{Nb+Ta}-0.2)$, wherein Ai represents the annealing parameter for the i-th annealing, ti represents the annealing time (hours) for the i-th annealing, Ti represents the annealing temperature (K) at the i-th annealing, and $X_{Nb+Ta}$ represents the total concentration of Nb and Ta (wt %); and the accumulated annealing parameter $\Sigma Ai$ further satisfies the relationships:

when $0.05 \leq X_{Nb+Ta} \leq 0.5$, $-20 \leq \log\Sigma Ai \leq -15$, and $X_{Nb+Ta}$ $-18-10 \cdot X_{Nb+Ta} \leq \log\Sigma Ai \leq -15-10 \cdot (X_{Nb+Ta}-0.2)$; and when $0.5 < X_{Nb+Ta}$ $-20 \leq \log\Sigma Ai \leq -18-2 \cdot (X_{Nb+Ta}-0.5)$.

In these aspects, it is preferable that annealing prior to the final cold rolling be performed in a range of temperatures between about 650° C. and about 770° C. for a period of time between about 1 and about 10 minutes followed by quenching by argon gas.

In addition, in these aspects, it is preferable that the various steps are preformed sequentially.

A fifth aspect of the present invention is Zr alloy nuclear reactor fuel cladding, having excellent corrosion resistance and creep properties, made by one of the methods described above.

DESCRIPTION OF THE PREFERRED EMBODIMENTS

In general, Zr alloy cladding for nuclear reactor fuel is produced through steps of melting, ingot forging, solution heat treatment, hot extrusion, repeated cycles of annealing and cold rolling, annealing prior to final cold rolling, final cold rolling, and then final stress relief annealing.

The ingot forging is hot forging to decompose the cast structure and is performed in a range of temperature between about 800° C. and about 1,100° C. The solution heat treatment is performed by holding the forged alloy in a range of temperatures between about 1,000° C. and about 1,100° C. and then cooling the alloy with water so as to eliminate microscopic segregation of elements in the alloy. In the hot extrusion, the Zr alloy is heated in a range of temperatures between about 600° C. and about 800° C. and then extruded to form a seamless tube. The annealing is generally performed in a vacuum furnace, after the hot extrusion and before the subsequent cold rolling. The subsequent cold rolling is generally performed using a pilger mill in the case of the Zr alloy cladding. The final stress relief annealing is generally performed in a range of temperatures between about 450° C. and about 500° C. for a period of time between about 1 and about 4 hours so as to relieve the stress in the Zr alloy cladding.

The method for making the Zr alloy cladding in accordance with the present invention is characterized as follows. When the alloy has a composition of 0.2 to 1.7% Sn, 0.18 to 0.6% Fe, 0.07 to 0.4% Cr and 0.05 to 1.0% Nb, with the remainder being Zr and incidental impurities, and the incidental nitrogen impurity content being 60 ppm or less, the annealings after the hot extrusion and before the final cold rolling are performed so as to satisfy the conditions described in the above-mentioned first or second aspect. When the alloy has a composition of 0.2 to 1.7% Sn, 0.18 to 0.6% Fe, 0.07 to 0.4% Cr, 0.05 to 1.0% Nb and 0.01 to 0.1% Ta, with the remainder being Zr and incidental impurities, and the incidental nitrogen impurity content being 60 ppm or less, the annealings after the hot extrusion and before the final cold rolling are performed so as to satisfy the conditions described in the above-mentioned third or fourth aspect.

The accumulated annealing parameter $\Sigma Ai = \Sigma ti \cdot \exp(-40,000/Ti)$ must satisfy the relationship $-20 \leq \log\Sigma Ai \leq -15$. When $-20 \leq \log\Sigma Ai$, the Zr alloy cladding is fully annealed as a result of the repeated annealing steps. Since the repeated annealing steps must be performed within the α-zirconium phase region, $\log\Sigma Ai \leq -15$ must be satisfied.

The accumulated annealing parameter $\Sigma Ai$ is greatly affected by the Nb concentration ($X_{Nb}$) and the total concentration of Nb+Ta ($X_{Nb+Ta}$). Thus, the following conditions must also be satisfied:

$-18-10 \cdot X_{Nb} \leq \log\Sigma Ai \leq -15-3.75 \cdot (X_{Nb}-0.2)$ for the Nb-containing Zr alloy, or $-18-10 \cdot X_{Nb+Ta} \leq \log\Sigma Ai \leq -15-3.75 \cdot (X_{Nb+Ta}-0.2)$ for the Nb/Ta-containing Zr alloy, wherein the concentrations $X_{Nb}$ and $X_{Nb+Ta}$ are represented by percent by weight.

It is preferred that the accumulated annealing parameter $\Sigma Ai$ for the Nb-containing Zr alloy be defined in more detail as follows, because it significantly depends on the concentrations $X_{Nb}$.

When $0.05 \leq X_{Nb} \leq 0.5$, the annealing is performed so as to satisfy the relationships:

$-20 \leq \log\Sigma Ai \leq -15$, and $-18-10 \cdot X_{Nb} \leq \log\Sigma Ai \leq -15-10 \cdot (X_{Nb}-0.2)$, or when $0.5 < X_{Nb}$, the annealing is performed so as to satisfy the relationships:

$-20 \leq \log\Sigma Ai \leq -18-2 \cdot (X_{Nb}-0.5)$.

Similarly, it is preferred that the accumulated annealing parameter $\Sigma Ai$ for the Nb/Ta-containing Zr alloy be defined in more detail as follows.

When $0.05 \leq X_{Nb+Ta} \leq 0.5$, the annealing is performed so as to satisfy the relationships:

$-20 \leq \log\Sigma Ai \leq -15$, and $-18 - 10 \cdot X_{Nb+Ta} \leq \log\Sigma Ai \leq -15 - 10 \cdot (X_{Nb+Ta} - 0.2)$, or when $0.5 < X_{Nb+Ta}$, the annealing is performed so as to satisfy the relationships:

$-20 \leq \log\Sigma Ai \leq -18 - 2 \cdot (X_{Nb+Ta} - 0.5)$.

Figure 1:
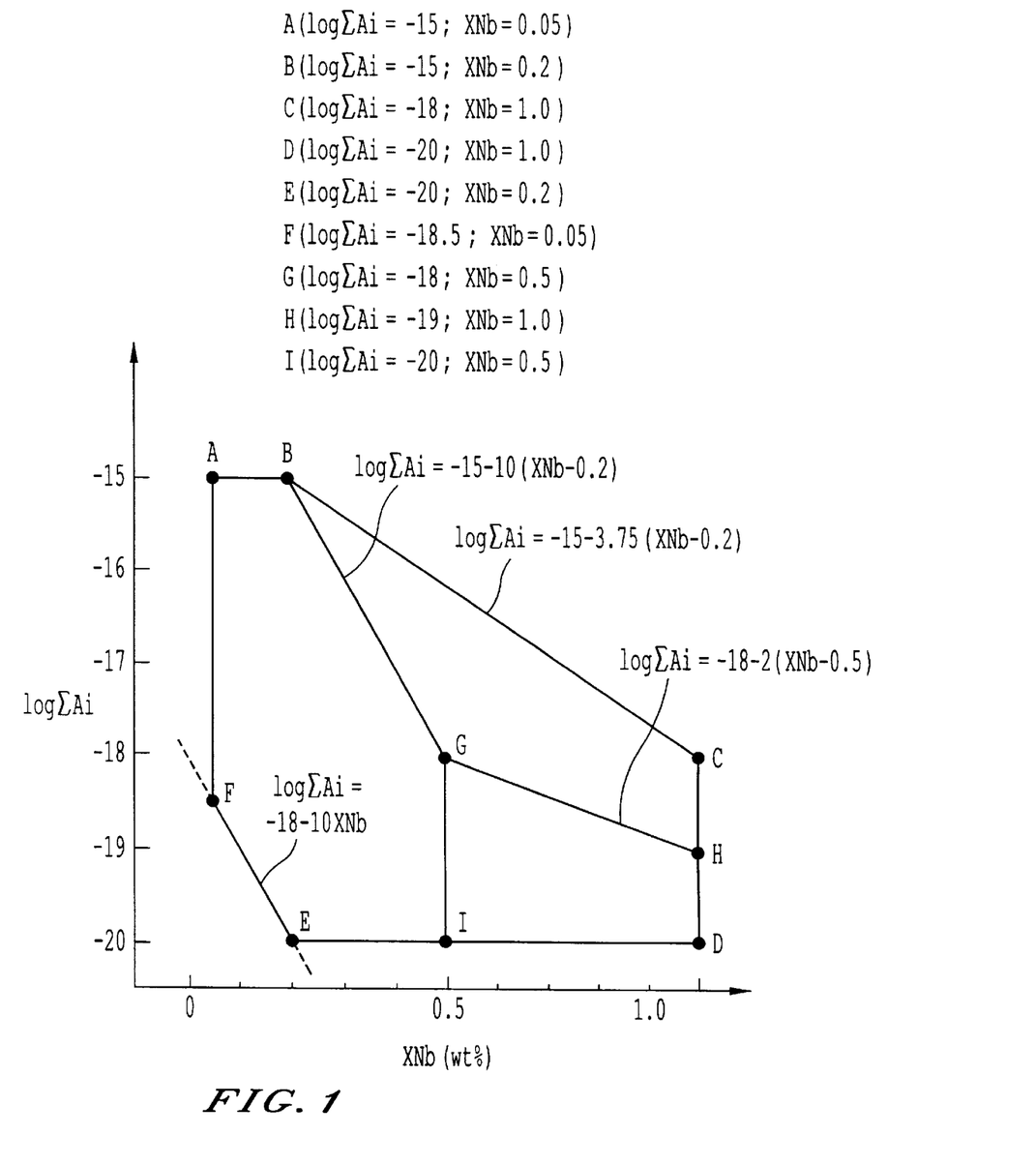
FIG. 1 is a graph of the range of annealing conditions in a method for making Zr alloy cladding in accordance with the present invention.

FIG. 1 is a graph showing a preferred annealing range for producing Nb-containing Zr alloy cladding for nuclear reactor fuel. The Nb-containing Zr alloy has a composition of 0.2 to 1.7% Sn, 0.18 to 0.6% Fe, 0.07 to 0.4% Cr and 0.05 to 1.0% of Nb, with the remainder being Zr and incidental impurities, and the incidental nitrogen impurity content being 60 ppm or less. In FIG. 1, the horizontal axis indicates $\log\Sigma Ai$ and the vertical axis indicates the Nb concentration ($X_{Nb}$). The coordinates of dots A, B, C, D, E, F, G, H, and I are set as follows:

A($\log\Sigma Ai=-15$, $X_{Nb}=0.05$),

B($\log\Sigma Ai=-15$, $X_{Nb}=0.2$),

C($\log\Sigma Ai=-18$, $X_{Nb}=1.0$),

D($\log\Sigma Ai=-20$, $X_{Nb}=1.0$),

E($\log\Sigma Ai=-20$, $X_{Nb}=0.2$),

F($\log\Sigma Ai=-18.5$, $X_{Nb}=0.05$),

G($\log\Sigma Ai=-18$, $X_{Nb}=0.5$),

H($\log\Sigma Ai=-19$, $X_{Nb}=1.0$), and

I($\log\Sigma Ai=-20$, $X_{Nb}=0.5$)

The annealing range in the method for making the Nb-containing Zr cladding in accordance with the first aspect of the present invention is defined by the area surrounded with lines AB, BC, CD, DE, EF, and FA in FIG. 1.

The annealing range in the method for making the Nb-containing Zr cladding in accordance with the second aspect of the present invention is defined by the area surrounded with lines AB, BG, GI, IE, EF, and FA for $0.05 \leq X_{Nb} \leq 0.5$, or the area surrounded with lines GH, HD, DI, and IG for $0.5 < X_{Nb}$.

Figure 2:
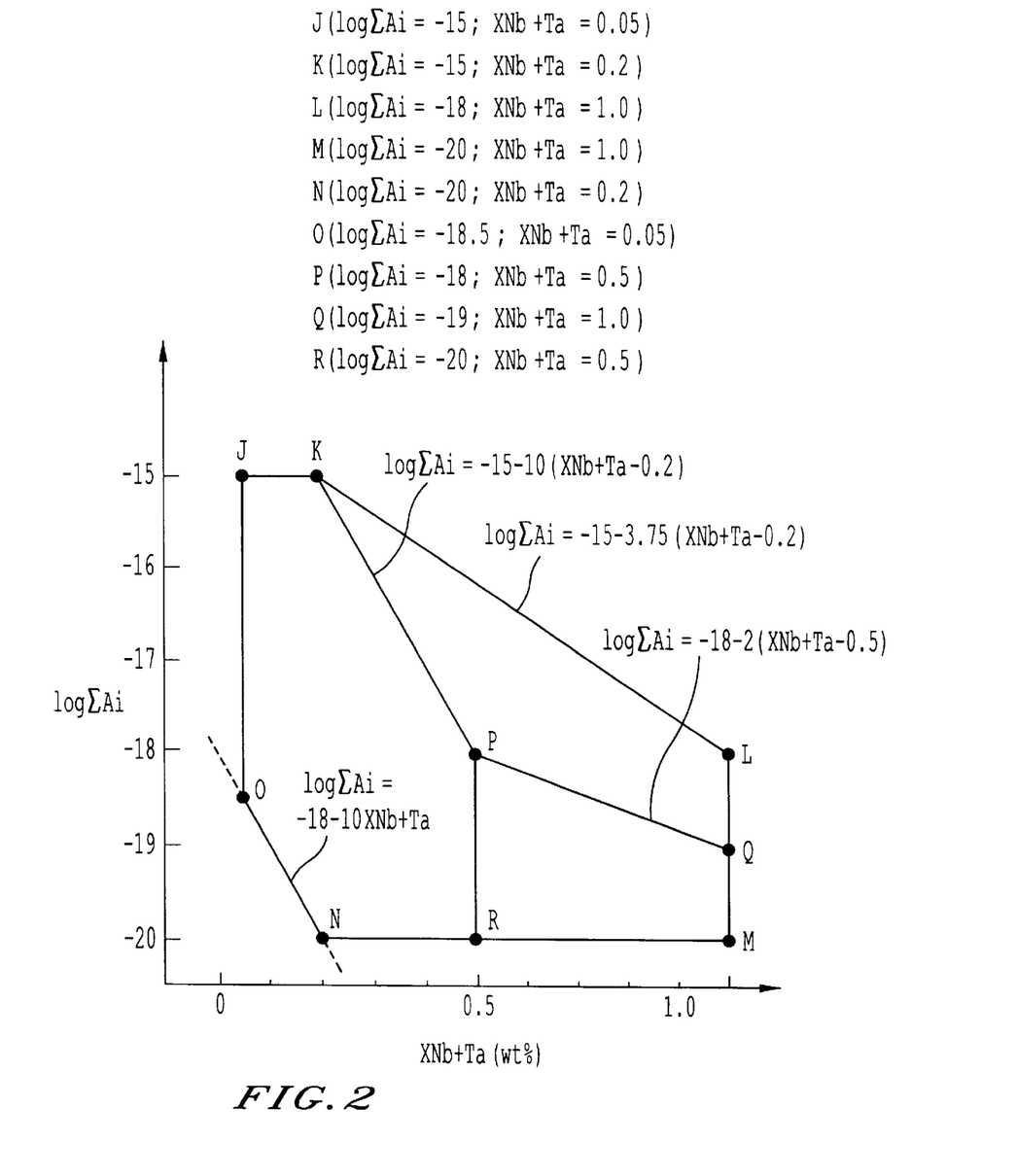
FIG. 2 is a graph of the range of annealing conditions in a method for making Zr alloy cladding in accordance with the present invention.

FIG. 2 is a graph showing a preferred annealing range for producing Nb/Ta-containing Zr alloy cladding for nuclear reactor fuel The Nb/Ta-containing Zr alloy has a composition of 0.2 to 1.7% Sn, 0.18 to 0.6% Fe, 0.07 to 0.4% Cr, 0.05 to 1.0% Nb and 0.01 to 0.1% Ta, with the remainder being Zr and incidental impurities, and the incidental nitrogen impurity content being 60 ppm or less. In FIG. 2, the horizontal axis indicates $\log\Sigma Ai$ and the vertical axis indicates the total concentration of Nb and Ta ($X_{Nb+Ta}$). The coordinates of dots J, K, L, M, N, O, P, Q, and R are set as follows:

J($\log\Sigma Ai=-15$, $X_{Nb+Ta}=0.05$),

K($\log\Sigma Ai=-15$, $X_{Nb+Ta}=0.2$),

L($\log\Sigma Ai=-18$, $X_{Nb+Ta}=1.0$),

M($\log\Sigma Ai=-20$, $X_{Nb+Ta}=1.0$),

N($\log\Sigma Ai=-20$, $X_{Nb+Ta}=0.2$),

O($\log\Sigma Ai=-18.5$, $X_{Nb+Ta}=0.05$),

P($\log\Sigma Ai=-18$, $X_{Nb+Ta}=0.5$),

Q($\log\Sigma Ai=-19$, $X_{Nb+Ta}=1.0$), and

R($\log\Sigma Ai=-20$, $X_{Nb+Ta}=0.5$)

The annealing range in the method for making the Nb/Ta-containing Zr cladding in accordance with the third aspect of the present invention is defined by the area surrounded with lines JK, KL, LM, MN, NO, and OJ in FIG. 2.

The annealing range in the method for making the Nb/Ta-containing Zr cladding in accordance with the fourth aspect of the present invention is defined by the area surrounded with lines JK, KP, PR, RN, NO, and OJ for $0.05 \leq X_{Nb+Ta} \leq 0.5$, or the area surrounded with lines PQ, QM, MR, and RP for $0.5 < X_{Nb+Ta}$.

In the more preferred embodiments of the method for making the Zr alloy cladding in accordance with the present invention, satisfying the annealing conditions shown in FIG. 1 or FIG. 2, the annealing prior to the final cold rolling is performed in a range of temperatures between about 650° C. and about 770° C. for a significantly short time period of between about 1 and about 10 minutes, and then the cladding is quenched with argon gas. This annealing is accomplished by introducing a reduced volume of cladding into a vessel maintained at a high temperature in order to rapidly heat the cladding and then introducing high-purity argon gas into the vessel to rapidly cool the cladding.

The ground for limiting the range of the composition of the Zr alloy in accordance with the present invention are now described.

(A) Sn

Tin (Sn) improves the strength of the alloy when the content is 0.2% or more. On the other hand, the corrosion resistance of the alloy significantly decreases when the content is higher than 1.7%. Thus, the Sn content is set to 0.2 to 1.7%.

(B) Fe and Cr

A combination of these components contributes to improvements in corrosion resistance and creep properties of the alloy when the Fe content is 0.18% or more and the Cr content is 0.07% or more. The corrosion resistance, however, significantly decreases when the Fe content is higher than 0.6% and the Cr content is higher than 0.4%. Thus, the Fe content is set to 0.18 to 0.6%, and the Cr content is set to 0.07 to 0.4%.

(C) Nb and Ta

These components contribute to further improvements in corrosion resistance and creep properties of the alloy when the Nb content is 0.05% or more or the Ta content is 0.01% or more. The corrosion resistance, however, significantly decreases when the Nb content is higher than 1.0% or the Ta content is higher than 0.1%. Thus, the Nb content is set to 0.05 to 1.0%, and the Ta content is set to 0.01 to 0.1%.

(D) N as an incidental impurity

Nitrogen (N) is a significantly harmful component and deteriorates corrosion resistance of the alloy. Since the corrosion resistance significantly decreases when the N content is higher than 60 ppm, the upper limit of the N content is set to 60 ppm.

The method for making the Zr alloy cladding for a nuclear reactor fuel in accordance with the present invention will now be described in more detail based on the following examples.

EXAMPLES

Zr alloy ingots 1 to 64 having compositions shown in Tables 1 to 6 are prepared as follows. A Zr sponge with a purity of 99.8%, and granular Sn, Fe, Cr, Nb and Ta each having a purity of 99.9% or more are compounded based on the compositions to form electrodes. Electrodes are melted in a consumable electrode-type vacuum arc furnace to form Zr alloy ingots.

TABLE 1

Composition (% by weight)
(Balance: Zr and incidental impurities)

TABLE 1

| Type | | Sn | Fe | Cr | Nb | Ta | N (ppm) |
|---|---|---|---|---|---|---|---|
| Zr | 1 | 1.13 | 0.22 | 0.11 | 0.053 | — | 32 |
| alloy | 2 | 1.02 | 0.22 | 0.10 | 0.11 | — | 29 |
| ingot | 3 | 1.66 | 0.21 | 0.11 | 0.21 | — | 25 |
| | 4 | 1.21 | 0.21 | 0.11 | 0.22 | — | 30 |
| | 5 | 0.95 | 0.183 | 0.11 | 0.21 | — | 34 |
| | 6 | 0.97 | 0.37 | 0.11 | 0.20 | — | 28 |
| | 7 | 0.99 | 0.58 | 0.11 | 0.19 | — | 31 |
| | 8 | 1.01 | 0.21 | 0.075 | 0.20 | — | 26 |
| | 9 | 0.92 | 0.21 | 0.20 | 0.22 | — | 33 |
| | 10 | 0.97 | 0.21 | 0.38 | 0.21 | — | 29 |
| | 11 | 0.98 | 0.44 | 0.23 | 0.22 | — | 30 |

TABLE 2

Composition (% by weight)
(Balance: Zr and incidental impurities)

| Type | | Sn | Fe | Cr | Nb | Ta | N (ppm) |
|---|---|---|---|---|---|---|---|
| Zr | 12 | 0.94 | 0.58 | 0.39 | 0.20 | — | 35 |
| alloy | 13 | 0.75 | 0.20 | 0.10 | 0.19 | — | 32 |
| ingot | 14 | 0.49 | 0.187 | 0.11 | 0.22 | — | 33 |
| | 15 | 0.49 | 0.39 | 0.11 | 0.21 | — | 27 |
| | 16 | 0.49 | 0.57 | 0.11 | 0.19 | — | 41 |
| | 17 | 0.49 | 0.21 | 0.078 | 0.20 | — | 30 |
| | 18 | 0.49 | 0.21 | 0.22 | 0.21 | — | 55 |
| | 19 | 0.49 | 0.21 | 0.39 | 0.20 | — | 28 |
| | 20 | 0.49 | 0.41 | 0.22 | 0.20 | — | 25 |
| | 21 | 0.49 | 0.58 | 0.38 | 0.22 | — | 31 |
| | 22 | 0.24 | 0.21 | 0.11 | 0.20 | — | 34 |

TABLE 3

Composition (% by weight)
(Balance: Zr and incidental impurities)

| Type | | Sn | Fe | Cr | Nb | Ta | N(ppm) |
|---|---|---|---|---|---|---|---|
| Zr | 23 | 0.85 | 0.20 | 0.09 | 0.36 | — | 26 |
| alloy | 24 | 0.77 | 0.184 | 0.11 | 0.49 | — | 33 |
| ingot | 25 | 0.81 | 0.38 | 0.11 | 0.48 | — | 29 |
| | 26 | 0.80 | 0.57 | 0.11 | 0.47 | — | 30 |
| | 27 | 0.80 | 0.19 | 0.075 | 0.49 | — | 57 |
| | 28 | 0.79 | 0.19 | 0.20 | 0.48 | — | 40 |
| | 29 | 0.77 | 0.19 | 0.36 | 0.49 | — | 31 |
| | 30 | 0.78 | 0.41 | 0.20 | 0.47 | — | 28 |
| | 31 | 0.81 | 0.58 | 0.37 | 0.49 | — | 33 |
| | 32 | 0.49 | 0.20 | 0.11 | 0.49 | — | 30 |
| | 33 | 0.21 | 0.183 | 0.11 | 0.48 | — | 28 |

TABLE 4

Composition (% by weight)
(Balance: Zr and incidental impurities)

| Type | | Sn | Fe | Cr | Nb | Ta | N (ppm) |
|---|---|---|---|---|---|---|---|
| Zr | 34 | 0.22 | 0.38 | 0.11 | 0.49 | — | 27 |
| alloy | 35 | 0.20 | 0.57 | 0.11 | 0.48 | — | 31 |
| ingot | 36 | 0.21 | 0.20 | 0.076 | 0.49 | — | 30 |
| | 37 | 0.22 | 0.20 | 0.19 | 0.49 | — | 35 |
| | 38 | 0.23 | 0.20 | 0.38 | 0.48 | — | 27 |
| | 39 | 0.21 | 0.40 | 0.21 | 0.49 | — | 29 |
| | 40 | 0.22 | 0.59 | 0.38 | 0.49 | — | 32 |
| | 41 | 0.77 | 0.21 | 0.11 | 0.75 | — | 28 |
| | 42 | 0.52 | 0.21 | 0.11 | 0.75 | — | 27 |
| | 43 | 1.01 | 0.19 | 0.10 | 0.98 | — | 33 |
| | 44 | 0.23 | 0.19 | 0.10 | 0.99 | — | 35 |

TABLE 5

Composition (% by weight)
(Balance: Zr and incidental impurities)

| Type | | Sn | Fe | Cr | Nb | Ta | N (ppm) |
|---|---|---|---|---|---|---|---|
| Zr | 45 | 1.15 | 0.21 | 0.10 | 0.051 | 0.013 | 25 |
| alloy | 46 | 1.65 | 0.20 | 0.10 | 0.15 | 0.06 | 29 |
| ingot | 47 | 0.95 | 0.183 | 0.11 | 0.16 | 0.05 | 28 |
| | 48 | 0.97 | 0.38 | 0.12 | 0.12 | 0.09 | 35 |
| | 49 | 0.97 | 0.57 | 0.09 | 0.18 | 0.02 | 31 |
| | 50 | 0.99 | 0.20 | 0.074 | 0.15 | 0.05 | 56 |
| | 51 | 1.01 | 0.20 | 0.19 | 0.13 | 0.08 | 45 |
| | 52 | 0.96 | 0.21 | 0.39 | 0.17 | 0.02 | 34 |
| | 53 | 0.98 | 0.43 | 0.21 | 0.14 | 0.06 | 27 |
| | 54 | 0.97 | 0.59 | 0.38 | 0.11 | 0.09 | 30 |
| | 55 | 0.25 | 0.20 | 0.10 | 0.15 | 0.05 | 31 |

TABLE 6

Composition (% by weight)
(Balance: Zr and incidental impurities)

| Type | | Sn | Fe | Cr | Nb | Ta | N (ppm) |
|---|---|---|---|---|---|---|---|
| Zr | 56 | 0.79 | 0.182 | 0.11 | 0.48 | 0.01 | 28 |
| alloy | 57 | 0.77 | 0.37 | 0.12 | 0.43 | 0.05 | 26 |
| ingot | 58 | 0.81 | 0.58 | 0.12 | 0.41 | 0.08 | 33 |
| | 59 | 0.80 | 0.20 | 0.073 | 0.47 | 0.02 | 52 |
| | 60 | 0.79 | 0.21 | 0.21 | 0.44 | 0.05 | 28 |
| | 61 | 0.80 | 0.20 | 0.37 | 0.40 | 0.08 | 40 |
| | 62 | 0.78 | 0.43 | 0.19 | 0.45 | 0.03 | 29 |
| | 63 | 0.79 | 0.57 | 0.36 | 0.43 | 0.06 | 30 |
| | 64 | 0.26 | 0.20 | 0.11 | 0.93 | 0.05 | 32 |

Example 1

Zr alloy ingots 1 to 64 shown in Tables 1 to 6 are subjected to forging at 1,010° C. to decompose the cast structure, heating at 1,010° C., quenching with water for solution heat treatment, machine working to remove oxide scales, hot extrusion at 600° C., machine working to remove oxide scales, three cycles of annealing and cold rolling under the conditions of log$\Sigma$Ai shown in Tables 7 to 12, and final stress relief annealing at 450° C. for two hours. Zr alloy cladding tubes 1 to 64 having a thickness of 0.5 mm are produced. The resulting cladding tubes are subjected to the following tests.

Corrosion Test

A test piece with a length of 50 mm is cut out from each Zr alloy cladding, washed with acetone, and immersed into pure water of a saturated vapor pressure of 190 atmospheres at 360° C. for 900 days in a static autoclave. An increased weight of each test piece per unit surface area ((weight after testing–weight before testing)/surface area of test piece) (unit: mg/dm$^2$) is shown in Tables 7 to 12.

Creep Test

Each test piece from Zr alloy cladding is pressurized internally and maintained at a temperature of 400° C. for 15 days under a stress of 12 kg/mm$^2$. The outer diameter of the test piece is measured with a laser diameter gauge. The creep strain (%) is calculated from the increase of the outer diameter using the equation ((outer diameter after testing–outer diameter before testing)/outer diameter before testing)×100. The results are also shown in Tables 7 to 12.

Example 2

Zr alloy ingots 1 to 64 shown in Tables 1 to 6 are subjected to forging at 1,010° C. to decompose the cast structure, heating at 1,010° C., quenching with water for solution heat treatment, machine working to remove oxide scales, hot extrusion at 600° C., machine working to remove oxide scales, two cycles of annealing and cold rolling under the conditions of log$\Sigma$Ai shown in Tables 13 to 21, heating and cooling with argon gas under the conditions shown in Tables 13 to 21, final cold rolling, and then final stress relief annealing under the same conditions as in Example 1. Zr alloy cladding tubes 65 to 128 having a thickness of 0.5 mm are produced. The resulting cladding tubes are subjected to the corrosion test and the creep test as in Example 1. The results are also shown in Tables 13 to 21.

As described above, the Zr alloy cladding obtained by the method in accordance with the present invention has excellent corrosion resistance and creep properties, hence it can be used as a nuclear fuel cladding for a long period of time.

TABLE 7

| Type | Zr alloy ingot | log$\Sigma$AI | Increased weight per unit area of test piece after corrosion test (mg/dm$^2$) | Creep strain after creep test (%) |
|---|---|---|---|---|
| This invention's method | 1 | 1 | −16.8 | 294 | 2.66 |
| | 2 | 2 | −16.8 | 198 | 2.49 |
| | 3 | 3 | −16.0 | 234 | 1.88 |
| | 4 | 4 | −15.1 | 233 | 1.71 |
| | 5 | 5 | −17.9 | 185 | 2.93 |
| | 6 | 6 | −16.8 | 171 | 2.44 |
| | 7 | 7 | −16.0 | 171 | 1.86 |
| | 8 | 8 | −15.1 | 202 | 1.82 |
| | 9 | 9 | −17.9 | 189 | 2.85 |
| | 10 | 10 | −16.8 | 191 | 2.40 |
| | 11 | 11 | −16.0 | 189 | 1.86 |

TABLE 8

| Type | Zr alloy ingot | log$\Sigma$AI | Increased weight per unit area of test piece after corrosion test (mg/dm$^2$) | Creep strain after creep test (%) |
|---|---|---|---|---|
| This invention's method | 12 | 12 | −15.1 | 206 | 1.65 |
| | 13 | 13 | −16.8 | 162 | 2.62 |
| | 14 | 14 | −16.0 | 150 | 2.22 |
| | 15 | 15 | −16.8 | 141 | 2.67 |
| | 16 | 16 | −16.8 | 135 | 2.63 |
| | 17 | 17 | −16.8 | 149 | 2.71 |
| | 18 | 18 | −16.8 | 159 | 2.66 |
| | 19 | 19 | −16.8 | 163 | 2.64 |
| | 20 | 20 | −16.8 | 151 | 2.61 |
| | 21 | 21 | −17.9 | 152 | 2.94 |
| | 22 | 22 | −16.0 | 133 | 2.33 |

TABLE 9

| Type | Zr alloy ingot | log$\Sigma$AI | Increased weight per unit area of test piece after corrosion test (mg/dm$^2$) | Creep strain after creep test (%) |
|---|---|---|---|---|
| This invention's method | 23 | 23 | −17.9 | 246 | 2.84 |
| | 24 | 24 | −17.9 | 251 | 2.69 |
| | 25 | 25 | −17.9 | 243 | 2.63 |
| | 26 | 26 | −17.9 | 240 | 2.57 |
| | 27 | 27 | −17.9 | 255 | 2.73 |
| | 28 | 28 | −17.9 | 262 | 2.66 |
| | 29 | 29 | −17.9 | 267 | 2.61 |
| | 30 | 30 | −17.9 | 249 | 2.60 |
| | 31 | 31 | −17.9 | 266 | 2.54 |
| | 32 | 32 | −17.9 | 234 | 2.75 |
| | 33 | 33 | −17.9 | 212 | 2.81 |

TABLE 10

| Type | Zr alloy ingot | log$\Sigma$AI | Increased weight per unit area of test piece after corrosion test (mg/dm$^2$) | Creep strain after creep test (%) |
|---|---|---|---|---|
| This invention's method | 34 | 34 | −17.9 | 208 | 2.77 |
| | 35 | 35 | −17.9 | 202 | 2.77 |
| | 36 | 36 | −17.9 | 216 | 2.80 |
| | 37 | 37 | −17.9 | 221 | 2.77 |
| | 38 | 38 | −17.9 | 223 | 2.74 |
| | 39 | 39 | −17.9 | 204 | 2.79 |
| | 40 | 40 | −17.9 | 210 | 2.77 |
| | 41 | 41 | −17.9 | 291 | 2.66 |
| | 42 | 42 | −17.9 | 290 | 2.72 |
| | 43 | 43 | −18.8 | 294 | 2.50 |
| | 44 | 44 | −18.8 | 250 | 2.72 |

TABLE 11

| Type | Zr alloy ingot | log$\Sigma$AI | Increased weight per unit area of test piece after corrosion test (mg/dm$^2$) | Creep strain after creep test (%) |
|---|---|---|---|---|
| This invention's method | 45 | 45 | −16.8 | 284 | 2.65 |
| | 46 | 46 | −17.9 | 241 | 2.65 |
| | 47 | 47 | −17.9 | 180 | 2.89 |
| | 48 | 48 | −17.9 | 177 | 2.83 |
| | 49 | 49 | −17.9 | 171 | 2.81 |
| | 50 | 50 | −17.9 | 180 | 2.91 |
| | 51 | 51 | −17.9 | 193 | 2.91 |
| | 52 | 52 | −17.9 | 201 | 2.82 |
| | 53 | 53 | −17.9 | 192 | 2.85 |
| | 54 | 54 | −17.9 | 188 | 2.81 |
| | 55 | 55 | −16.8 | 129 | 2.83 |

TABLE 12

Increased weight per unit area of

| Type | Zr alloy ingot | logΣAl | test piece after corrosion test (mg/dm²) | Creep strain after creep test (%) |
|---|---|---|---|---|
| This invention's method | 56 | 56 | −17.9 | 248 | 2.72 |
| | 57 | 57 | −17.9 | 233 | 2.72 |
| | 58 | 58 | −17.9 | 252 | 2.61 |
| | 59 | 59 | −17.9 | 261 | 2.81 |
| | 60 | 60 | −17.9 | 260 | 2.67 |
| | 61 | 61 | −17.9 | 264 | 2.71 |
| | 62 | 62 | −17.9 | 252 | 2.75 |
| | 63 | 63 | −17.9 | 281 | 2.51 |
| | 64 | 64 | −17.9 | 248 | 2.70 |

TABLE 13

| Type | Zr alloy ingot | Log[Al] | Heating temp. (° C.) | Holding time (min) | after corrosion test (mg/dm²) | after creep test (%) |
|---|---|---|---|---|---|---|
| This invention's method | 65 | 1 | −17.8 | 720 | 5.2 | 289 | 2.98 |
| | 66 | 2 | −17.8 | 725 | 3.0 | 226 | 2.93 |
| | 67 | 3 | −19.5 | 670 | 2.2 | 291 | 2.83 |
| | 68 | 4 | −18.8 | 675 | 5.0 | 239 | 2.85 |
| | 69 | 5 | −18.8 | 680 | 6.1 | 220 | 2.91 |
| | 70 | 6 | −18.8 | 700 | 3.0 | 212 | 2.84 |
| | 71 | 7 | −18.8 | 720 | 1.2 | 207 | 2.81 |

TABLE 14

| Type | Zr alloy ingot | Log[Al] | Heating temp. (° C.) | Holding time (min) | after corrosion test (mg/dm²) | after creep test (%) |
|---|---|---|---|---|---|---|
| This invention's method | 72 | 8 | −17.8 | 730 | 2.5 | 188 | 2.88 |
| | 73 | 9 | −17.8 | 690 | 8.3 | 191 | 2.89 |
| | 74 | 10 | −17.8 | 660 | 5.5 | 234 | 2.82 |
| | 75 | 11 | −18.8 | 740 | 2.3 | 192 | 2.84 |
| | 76 | 12 | −17.8 | 770 | 1.0 | 194 | 2.88 |
| | 77 | 13 | −17.8 | 710 | 9.5 | 175 | 2.99 |
| | 78 | 14 | −17.8 | 725 | 3.0 | 159 | 2.98 |

TABLE 15

| Type | Zr alloy ingot | Log[Al] | Heating temp. (° C.) | Holding time (min) | after corrosion test (mg/dm²) | after creep test (%) |
|---|---|---|---|---|---|---|
| This invention's method | 79 | 15 | −17.8 | 720 | 5.5 | 143 | 2.94 |
| | 80 | 16 | −17.8 | 760 | 1.8 | 133 | 2.92 |
| | 81 | 17 | −17.8 | 700 | 9.8 | 155 | 2.97 |
| | 82 | 18 | −18.8 | 680 | 4.5 | 194 | 2.93 |
| | 83 | 19 | −17.8 | 730 | 5.0 | 169 | 2.99 |
| | 84 | 20 | −17.8 | 735 | 4.5 | 155 | 2.98 |

TABLE 15-continued

| Type | Zr alloy ingot | Log[Al] | Heating temp. (° C.) | Holding time (min) | after corrosion test (mg/dm²) | after creep test (%) |
|---|---|---|---|---|---|---|
| | 85 | 21 | −17.9 | 720 | 5.0 | 161 | 2.93 |

TABLE 16

| Type | Zr alloy ingot | Log[Al] | Heating temp. (° C.) | Holding time (min) | after corrosion test (mg/dm²) | after creep test (%) |
|---|---|---|---|---|---|---|
| This invention's method | 86 | 22 | −17.8 | 720 | 5.0 | 133 | 2.97 |
| | 87 | 23 | −17.8 | 700 | 8.8 | 243 | 2.85 |
| | 88 | 24 | −17.8 | 710 | 8.0 | 260 | 2.72 |
| | 89 | 25 | −17.8 | 730 | 3.2 | 251 | 2.64 |
| | 90 | 26 | −17.8 | 725 | 3.5 | 250 | 2.71 |
| | 91 | 27 | −17.8 | 760 | 1.0 | 259 | 2.77 |
| | 92 | 28 | −17.8 | 750 | 1.2 | 277 | 2.75 |

TABLE 17

| Type | Zr alloy ingot | Log[Al] | Heating temp. (° C.) | Holding time (min) | after corrosion test (mg/dm²) | after creep test (%) |
|---|---|---|---|---|---|---|
| This invention's method | 93 | 29 | −17.8 | 710 | 5.0 | 275 | 2.67 |
| | 94 | 30 | −17.8 | 700 | 9.0 | 266 | 2.71 |
| | 95 | 31 | −17.8 | 730 | 2.5 | 281 | 2.73 |
| | 96 | 32 | −17.8 | 720 | 5.0 | 241 | 2.81 |
| | 97 | 33 | −17.8 | 740 | 1.1 | 222 | 2.88 |
| | 98 | 34 | −17.8 | 730 | 2.6 | 223 | 2.82 |
| | 99 | 35 | −17.8 | 720 | 4.8 | 201 | 2.89 |

TABLE 18

| Type | Zr alloy ingot | Log[Al] | Heating temp. (° C.) | Holding time (min) | after corrosion test (mg/dm²) | after creep test (%) |
|---|---|---|---|---|---|---|
| This invention's method | 100 | 36 | −17.8 | 725 | 3.3 | 223 | 2.81 |
| | 101 | 37 | −17.8 | 710 | 5.0 | 225 | 2.82 |
| | 102 | 38 | −17.8 | 700 | 7.5 | 220 | 2.79 |
| | 103 | 39 | −17.8 | 740 | 1.2 | 207 | 2.81 |
| | 104 | 40 | −17.8 | 720 | 4.0 | 221 | 2.83 |
| | 105 | 41 | −18.8 | 650 | 8.1 | 282 | 2.94 |
| | 106 | 42 | −18.8 | 680 | 2.0 | 249 | 2.85 |

TABLE 19

| Type | Zr alloy ingot | Log[A1] | Annealing condition before final cold rolling | | Increased weight per unit area of test piece after corrosion test (mg/dm²) | Creep strain after creep test (%) |
|---|---|---|---|---|---|---|
| | | | Heating temp. (° C.) | Holding time (min) | | |
| This invention's method | 107 | 43 | −18.8 | 690 | 1.0 | 299 | 2.82 |
| | 108 | 44 | −18.8 | 660 | 5.0 | 262 | 2.91 |
| | 109 | 45 | −17.8 | 720 | 4.0 | 283 | 2.94 |
| | 110 | 46 | −17.8 | 725 | 3.0 | 242 | 2.66 |
| | 111 | 47 | −17.8 | 730 | 2.5 | 182 | 2.91 |
| | 112 | 48 | −17.8 | 710 | 7.0 | 174 | 2.81 |
| | 113 | 49 | −17.8 | 730 | 3.0 | 176 | 2.79 |

TABLE 20

| Type | Zr alloy ingot | Log[A1] | Annealing condition before final cold rolling | | Increased weight per unit area of test piece after corrosion test (mg/dm²) | Creep strain after creep test (%) |
|---|---|---|---|---|---|---|
| | | | Heating temp. (° C.) | Holding time (min) | | |
| This invention's method | 114 | 50 | −17.8 | 735 | 2.0 | 182 | 2.72 |
| | 115 | 51 | −17.8 | 710 | 5.2 | 188 | 2.88 |
| | 116 | 52 | −17.8 | 715 | 4.5 | 201 | 2.76 |
| | 117 | 53 | −17.8 | 720 | 3.8 | 197 | 2.79 |
| | 118 | 54 | −17.8 | 700 | 9.0 | 189 | 2.84 |
| | 119 | 55 | −17.8 | 705 | 5.5 | 142 | 2.98 |
| | 120 | 56 | −17.8 | 725 | 2.0 | 247 | 2.76 |

TABLE 21

| Type | Zr alloy ingot | Log[A1] | Annealing condition before final cold rolling | | Increased weight per unit area of test piece after corrosion test (mg/dm²) | Creep strain after creep test (%) |
|---|---|---|---|---|---|---|
| | | | Heating temp. (° C.) | Holding time (min) | | |
| This invention's method | 121 | 57 | −17.8 | 730 | 2.0 | 232 | 2.62 |
| | 122 | 58 | −18.8 | 670 | 3.5 | 190 | 2.81 |
| | 123 | 59 | −17.8 | 695 | 9.0 | 255 | 2.72 |
| | 124 | 60 | −17.8 | 715 | 4.0 | 249 | 2.79 |
| | 125 | 61 | −17.8 | 730 | 2.2 | 272 | 2.66 |
| | 126 | 62 | −17.8 | 720 | 3.0 | 272 | 2.73 |
| | 127 | 63 | −17.8 | 725 | 2.6 | 287 | 2.75 |
| | 128 | 64 | −18.8 | 680 | 2.5 | 267 | 2.94 |

The disclosures of the priority documents, application numbers 09-278935 and 10-287800, which were filed in Japan on Oct. 13, 1997 and Oct. 9, 1998, respectively, are incorporated herein by reference in their entireties.

While the present application has been described with reference to specific embodiments, it is not confined to the specific details set forth, but is intended to convey such modifications or changes as may come within the skill in the art.

What is claimed is:

1. A method for making Zr alloy nuclear reactor fuel cladding, the method comprising: performing hot forging, solution heat treatment, hot extruding, and repeated cycles of annealing and cold rolling, ending in a final cold rolling, of a Zr alloy comprising, by weight, 0.2 to 1.7% Sn, 0.18 to 0.6% Fe, 0.07 to 0.4% Cr and 0.05 to 1.0% Nb, with a remainder being Zr and incidental impurities, and an incidental nitrogen impurity content being 60 ppm or less, and then performing final stress relief annealing thereon; wherein said annealing is performed in a range of temperatures between about 550° C. and about 850° C. for a period of time between about 1 hour and about 4 hours such that an accumulated annealing parameter $\Sigma Ai$ represented by $\Sigma Ai = \Sigma ti \cdot \exp(-40,000/Ti)$ satisfies relationships as follow:

$-20 \leq \log \Sigma Ai \leq -15$, and $-18 - 10 \cdot X_{Nb} \leq \log \Sigma Ai \leq -15 - 3.75 \cdot (X_{Nb} - 0.2)$, wherein Ai represents an annealing parameter for an i-th annealing, ti represents annealing time (hours) for the i-th annealing, Ti represents annealing temperature (K) for the i-th annealing, and $X_{Nb}$ represents Nb concentration (wt %).

2. A method for making Zr alloy nuclear reactor fuel cladding, the method comprising: performing hot forging, solution heat treatment, hot extruding, and repeated cycles of annealing and cold rolling, ending in a final cold rolling, of a Zr alloy comprising, by weight, 0.2 to 1.7% Sn, 0.18 to 0.6% Fe, 0.07 to 0.4% Cr and 0.05 to 1.0% Nb, with a remainder being Zr and incidental impurities, and an incidental nitrogen impurity content being 60 ppm or less, and then performing final stress relief annealing thereon; wherein said annealing is performed in a range of temperatures between about 550° C. and about 850° C. for a period of time between about 1 hour and about 4 hours such that an accumulated annealing parameter $\Sigma Ai$ represented by $\Sigma Ai = \Sigma ti \cdot \exp(-40,000/Ti)$ satisfies relationships as follow:

$-20 \leq \log \Sigma Ai \leq -15$, and $-18 - 10 \cdot X_{Nb} \leq \log \Sigma Ai \leq -15 - 3.75 \cdot (X_{Nb} - 0.2)$, wherein Ai represents an annealing parameter for an i-th annealing, ti represents annealing time (hours) for the i-th annealing, Ti represents annealing temperature (K) for the i-th annealing, and $X_{Nb}$ represents Nb concentration (wt %); and the accumulated annealing parameter $\Sigma Ai$ satisfies further relationships as follow:

when $0.05 \leq X_{Nb} \leq 0.5$, $-20 \leq \log \Sigma Ai \leq -15$, and $-18 - 10 \cdot X_{Nb} \leq \log \Sigma Ai \leq -15 - 10 \cdot (X_{Nb} - 0.2)$; and when $0.5 < X_{Nb}$, $-20 \leq \log \Sigma Ai \leq -18 - 2 \cdot (X_{Nb} - 0.5)$.

3. A method for making Zr alloy nuclear reactor fuel cladding, the method comprising: performing hot forging, solution heat treatment, hot extruding, and repeated cycles of annealing and cold rolling, ending in a final cold rolling, of a Zr alloy comprising, by weight, 0.2 to 1.7% Sn, 0.18 to 0.6% Fe, 0.07 to 0.4% Cr, 0.05 to 1.0% Nb and 0.01 to 0.1% Ta, with a remainder being Zr and incidental impurities, and an incidental nitrogen impurity content being 60 ppm or less, and then performing final stress relief annealing thereon; wherein said annealing is performed in a range of temperatures between about 550° C. and about 850° C. for a period of time between about 1 hour and about 4 hours such that an accumulated annealing parameter $\Sigma Ai$ represented by $\Sigma Ai=\Sigma ti\cdot exp(-40,000/Ti)$ satisfies relationships as follow:

$-20 \leq \log\Sigma Ai \leq -15$, and $-18-10\cdot X_{Nb+Ta} \leq \log\Sigma Ai \leq -15-3.75\cdot(X_{Nb+Ta}-0.2)$, and wherein Ai represents an annealing parameter for an i-th annealing, ti represents annealing time (hours) for the i-th annealing, Ti represents annealing temperature (K) for the i-th annealing, and $X_{Nb+Ta}$ represents a total concentration of Nb and Ta (wt %).

4. A method for making Zr alloy nuclear reactor fuel cladding, the method comprising: performing hot forging, solution heat treatment, hot extruding, and repeated cycles of annealing and cold rolling, ending in a final cold rolling, of a Zr alloy comprising, by weight, 0.2 to 1.7% Sn, 0.18 to 0.6% Fe, 0.07 to 0.4% Cr, 0.05 to 1.0% Nb and 0.01 to 0.1% Ta, with a remainder being Zr and incidental impurities, and an incidental nitrogen impurity content being 60 ppm or less, and then performing final stress relief annealing thereon; wherein said annealing is performed in a range of temperatures between about 550° C. and about 850° C. for a period of time between about 1 hour and about 4 hours such that an accumulated annealing parameter $\Sigma Ai$ represented by $\Sigma Ai=\Sigma ti\cdot exp(-40,000/Ti)$ satisfies relationships as follow:

$-20 \leq \log\Sigma Ai \leq -15$, and $-18-10\cdot X_{Nb+Ta} \leq \log\Sigma Ai \leq -15-3.75\cdot(X_{Nb+Ta}-0.2)$, wherein Ai represents an annealing parameter for an i-th annealing, ti represents annealing time (hours) for the i-th annealing, Ti represents annealing temperature (K) for the -th annealing, and $X_{Nb+Ta}$ represents a total concentration of Nb and Ta (wt %); and the accumulated annealing parameter $\Sigma Ai$ satisfies further relationships as follow:

when $0.05 \leq X_{Nb+Ta} \leq 0.5$, $-20 \leq \log\Sigma Ai < -15$, and $-18-10\cdot X_{Nb+Ta} \leq \log\Sigma Ai \leq -15-10\cdot(X_{Nb+Ta}-0.2)$; and when $0.5 < X_{Nb+Ta}$, $-20 \leq \log\Sigma Ai \leq -18-2\cdot(X_{Nb+Ta}-0.5)$.

* * * * *

UNITED STATES PATENT AND TRADEMARK OFFICE
CERTIFICATE OF CORRECTION

PATENT NO.        : 6,125,161
APPLICATION NO.   : 09/397094
DATED             : September 26, 2000
INVENTOR(S)       : Takeshi Isobe and Yoshitaka Suda It is certified that error appears in the above-identified patent and that said Letters Patent is hereby corrected as shown below:

In Col 14, line 7, after the word "wherein", insert the expression

-- annealing prior to final cold rolling is performed in a range of temperatures between about 650°C and about 770°C for a period of time about 1 minute and about 10 minutes followed by quenching by argon gas; and--.

In Col. 14, line 8, prior to the word "said", insert the word --wherein--.

In Col 14, line 32, after the word "wherein", insert the expression

--annealing prior to final cold rolling is performed in a range of temperatures between about 650°C and about 770°C for a period of time about 1 minute and about 10 minutes followed by quenching by argon gas; and--.

In Col 14, line 33, prior to the word "said", insert the word --wherein--.

In Col 14, line 65, after the word "wherein", insert the expression

--annealing prior to final cold rolling is performed in a range of temperatures between about 650°C and about 770°C for a period fo time about 1 minute and about 10 minutes followed by quenching by argon gas; and--.

In Col 14, line 66, prior rto the word "asid", insert the word --wherein--.

In Col. 15, line 24, after the word "wherein", insert the expression

--annealing prior to final cold rolling is performed in a range of temperatures between about 650°C and about 770°C for a period of time about 1 minute and about 10 minutes followed by quenching by argon gas; and--.

UNITED STATES PATENT AND TRADEMARK OFFICE
CERTIFICATE OF CORRECTION

PATENT NO.         : 6,125,161
APPLICATION NO. : 09/397094
DATED              : September 26, 2000
INVENTOR(S)        : Takeshi Isobe and Yoshitaka Suda It is certified that error appears in the above-identified patent and that said Letters Patent is hereby corrected as shown below:

In Col. 15, line 25, prior to the word "said", insert the word --wherein--.

Signed and Sealed this

Twelfth Day of December, 2006

JON W. DUDAS
*Director of the United States Patent and Trademark Office*